(12) United States Patent
Duggal et al.

(10) Patent No.: US 12,374,329 B2
(45) Date of Patent: Jul. 29, 2025

(54) SYSTEM AND METHOD FOR SPEECH TO TEXT CONVERSION

(71) Applicant: JIO PLATFORMS LIMITED, Gujarat (IN)

(72) Inventors: Gaurav Duggal, Hyderabad (IN); Arijay Chaudhry, Pune (IN); Paras Ahuja, Hyderabad (IN); Anil Kumar Goyal, Hyderabad (IN); Venkateshwaran Mahadevan, Chennai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 487 days.

(21) Appl. No.: 17/566,966

(22) Filed: Dec. 31, 2021

(65) Prior Publication Data

US 2022/0215834 A1 Jul. 7, 2022

(30) Foreign Application Priority Data

Jan. 1, 2021 (IN) .............................. 202121000017

(51) Int. Cl.
| | | |
|---|---|---|
| *G10L 15/197* | (2013.01) | |
| *G06F 40/58* | (2020.01) | |
| *G10L 15/16* | (2006.01) | |
| *G10L 15/22* | (2006.01) | |
| *G10L 25/18* | (2013.01) | |

(52) U.S. Cl.
CPC ............ *G10L 15/197* (2013.01); *G06F 40/58* (2020.01); *G10L 15/16* (2013.01); *G10L 15/22* (2013.01); *G10L 25/18* (2013.01)

(58) Field of Classification Search
CPC ....... G10L 15/197; G10L 15/16; G10L 15/22; G10L 25/18; G06F 40/58
See application file for complete search history.

(56) References Cited

U.S. PATENT DOCUMENTS

| 7,587,312 B2* | 9/2009 | Kim .................... G10L 21/003 |
| | | 704/207 |
| 2002/0059073 A1* | 5/2002 | Zondervan ............ H04L 67/565 |
| | | 704/270.1 |
| 2005/0171944 A1* | 8/2005 | Palmquist ............... G06F 40/58 |
| 2006/0082662 A1* | 4/2006 | Isaacson ................ G10L 15/26 |
| | | 704/E15.045 |

(Continued)

*Primary Examiner* — Pierre Louis Desir
*Assistant Examiner* — Daniel W Chung
(74) *Attorney, Agent, or Firm* — FINNEGAN, HENDERSON, FARRABOW, GARRETT, & DUNNER LLP

(57) ABSTRACT

A system and a method for enabling automatic conversion of speech input to text is disclosed. The method involves receiving an audio file pertaining to speech of a user, extracting a first set of attributes indicative of plurality of time frames spaced along the duration of the audio file, extracting a second set of attributes indicative of speech patterns, predicting a first set of characters to generate a first output sentence, determining, through an artificial intelligence (AI) engine, a first data set comprising a corpus of sentences of a predefined language based on a predefined language usage parameters, and generating a textual output in the predefined language based on a combination of the extracted first and second set of attributes, the predicted first set of characters, and the AI engine based determination.

16 Claims, 10 Drawing Sheets

(56) References Cited

U.S. PATENT DOCUMENTS

| | | | |
|---|---|---|---|
| 2009/0063146 A1* | 3/2009 | Yoshioka | G10L 17/26 |
| | | | 704/250 |
| 2017/0133038 A1* | 5/2017 | Jiang | G10L 15/187 |
| 2018/0137109 A1* | 5/2018 | Mangoubi | G06F 40/263 |
| 2018/0293990 A1* | 10/2018 | Li | G10L 17/18 |
| 2020/0160836 A1* | 5/2020 | Chen | G10L 15/005 |
| 2020/0242137 A1* | 7/2020 | Williams | G06F 16/3332 |

* cited by examiner

406

406

```
ACOUSTIC MODEL
404
        |
        v
EMISSION MATRIX
406
```

SYSTEM AND METHOD FOR SPEECH TO TEXT CONVERSION

FIELD OF INVENTION

The embodiments of the present disclosure generally relate to speech processing systems. More particularly, the present disclosure relates to a system and method for conversion of a speech input to textual output.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Traditional systems of Speech-to-text engines use language specific language models with acoustic models using phonemic language identifiers that uses a dictionary written by experts that split the language identifiers for words as phonemes. These models have a lower requirement for the amount of data required to train the acoustic model to get a reliable speech transcription however they also require a huge dictionary of words that have been split into phonemes by experts for a better accuracy. These Models are usually strictly limited to a single language for splitting into the phonemes.

However, problems arise when language specific speech to text engines encounters speech having a mixture of two or more languages, for example Hinglish language which is prevalent in Indian subcontinent. The current language specific speech to text engines (for example English and Hindi Speech to text engines) fail when exposed to speech sentence mixed with two or more languages or dialects (example speech sentences having mixture of Hindi and English words). Such traditional speech to text engines changes the alien word (word in other language) to one of the native language specific word which results in incorrect transcription and changes the meaning of the whole sentence. The reason for such behaviour of language specific speech to text engine is the limited, language specific corpus on which the language model is trained.

There is therefore a need in the art to provide a system and a method that can train a speech to text engine on speech containing mixture of words from two or more languages and at the same time can be efficient, faster, cost-effective and reliable.

OBJECTS OF THE PRESENT DISCLOSURE

Some of the objects of the present disclosure, which at least one embodiment herein satisfies are as listed herein below.

It is an object of the present disclosure to provide a system and a method that facilitates converting a speech input having words from one or more languages in conjunction.

It is an object of the present disclosure to provide a system and a method that facilitates efficient handling of Hinglish words.

It is an object of the present disclosure to provide a system and a method to facilitate customization to address any combination of languages.

It is an object of the present disclosure to provide a system and a method that facilitates inclusion of a wide variety of speakers with different accents and dialects from across India.

It is an object of the present disclosure to provide a system and a method that facilitates inclusion of background noise, gender voice variations, tones, word usage and variations that are endemic to a specific region.

It is an object of the present disclosure to provide a system and a method that utilises slang words.

It is an object of the present disclosure to provide a system and a method to aid customer facing firms where they aim to resolve customer queries and provide them with appropriate resolutions.

It is an object of the present disclosure to provide a system and a method to facilitating learning in education domain.

It is an object of the present disclosure to provide a system and a method for enabling speech to text conversion in chat bots.

It is an object of the present disclosure to provide a system and a method for facilitating aid in automating transcriptions.

It is an object of the present disclosure to provide a system and a method for facilitating speech based controls.

It is an object of the present disclosure to provide a system and a method for facilitating aid in healthcare operations.

It is an object of the present disclosure to provide a system and a method for facilitating aid in accessibility for the differently-abled.

It is an object of the present disclosure to provide a system and a method that facilitates automatic emotion detection.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a system and method for enabling automatic conversion of speech input to textual output. In an aspect, the system includes a processor that executes a set of executable instructions that are stored in a memory, upon which execution, the processor may cause the system to receive a set of data packets of an audio file pertaining to speech of a user and extract, by an acoustic engine of the system, a first set of attributes from the received audio file, the first set of attributes can indicate plurality of time frames spaced along the duration of the audio file. The acoustic engine of the processor may also cause the system to extract, a second set of attributes from the first set of attributes, the second set of attributes can be indicative of speech patterns associated with any or a combination of at least two or more languages and at least two or more dialects of the speech, predict, by the acoustic engine, a first set of characters associated with each time frame of the plurality of time frames of the audio file based on the extracted first and second set of attributes. A first output sentence can be generated corresponding to predicted first set of characters. An AI engine can further cause the system to determine, a first data set associated with any or a combination of at least two or more languages. The first data set can include a corpus of sentences of a predefined language based on a predefined language usage parameters and based on a combination of the acoustic engine based extraction, acoustic engine based prediction and said AI engine based determination, generating a textual output in the predefined language. The textual output can be predicted from the first dataset that can include predefined words corresponding to the speech input.

In another aspect, the present disclosure includes method for automatic conversion of a speech input to textual output. The method may be executed by a processor, and includes the steps of: receiving a set of data packets of an audio file pertaining to speech of a user; extracting, by an acoustic engine of the system, a first set of attributes from the received audio file, the first set of attributes can indicate plurality of time frames spaced along the duration of the audio file; extracting, by the acoustic engine, a second set of attributes from the first set of attributes, the second set of attributes can be indicative of speech patterns associated with any or a combination of at least two or more languages and at least two or more dialects of the speech; predicting, by the acoustic engine, a first set of characters associated with each time frame of the plurality of time frames of the audio file based on the extracted first and second set of attributes and generating a first output sentence corresponding to predicted first set of characters; determining, a first data set associated with any or a combination of at least two or more languages, the first data set can include a corpus of sentences of a predefined language corresponding to a predefined language usage parameters; and based on a combination of the acoustic engine based extraction, acoustic engine based prediction and said AI engine based determination, generating a textual output in the predefined language. The textual output can be predicted from the first dataset that can include predefined words corresponding to the speech input.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
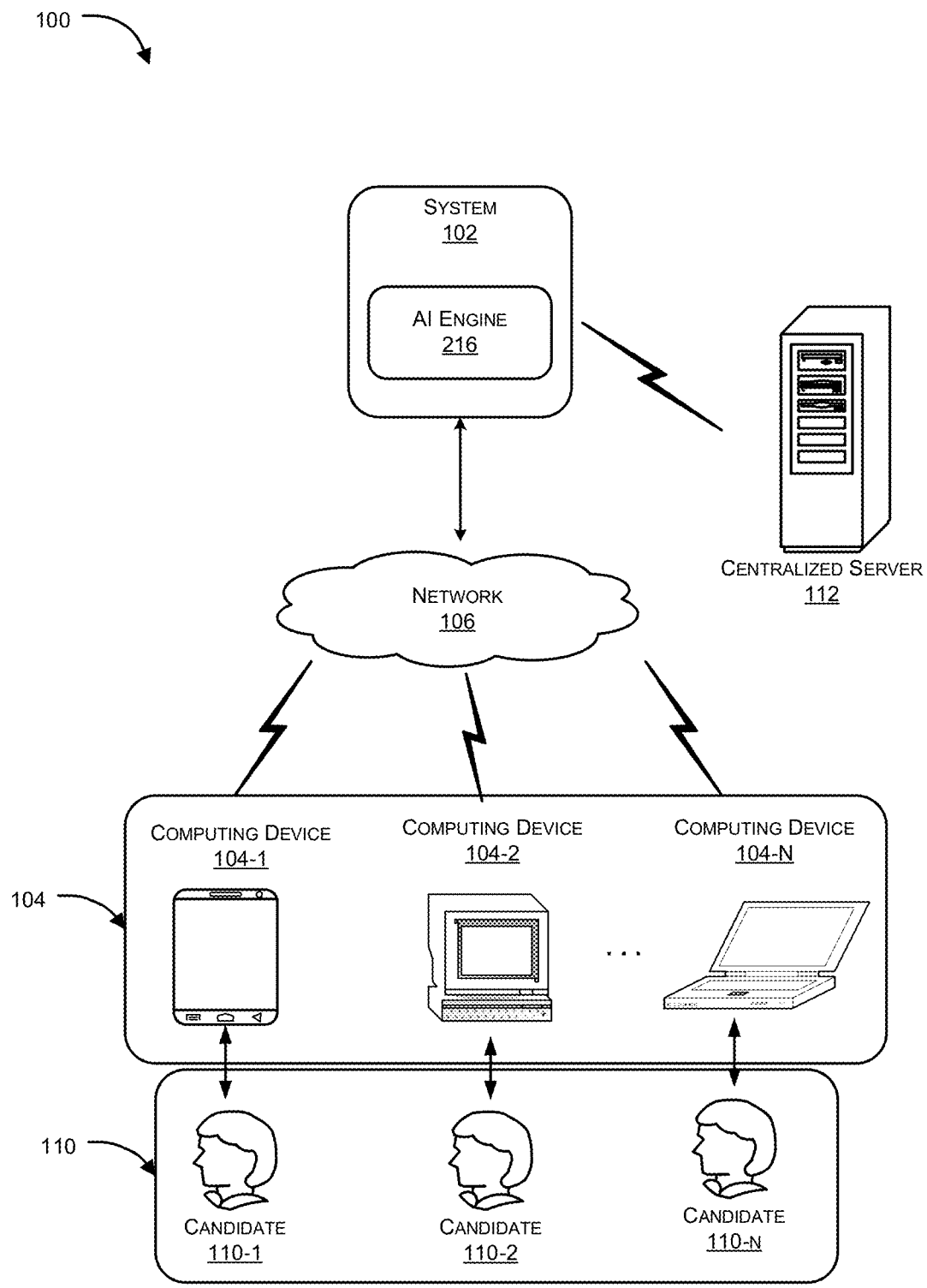
FIG. 1 illustrates an exemplary network architecture (100) in which or with which the system of the present disclosure can be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

The present invention provides solution to the above-mentioned problem in the art by providing a system and a method for efficiently converting a speech-based input to textual output (also referred to as text hereinafter). Particularly, the system and method provide a solution where the speech input is a combination of at least two or more languages and dialects. First attributes pertaining to a plurality of time frames can be extracted from an audio file and then second attributes indicative of speech patterns of any or a combination of at least two or more languages and at least two or more dialects of the speech can be extracted by an acoustic engine of the processor through a set of instructions executable at the processor. Based on the extractions, the acoustic engine can predict a first set of characters associated with the audio file. Then through an indigenous artificial intelligence (AI) engine, a first dataset can be determined that can include a corpus of sentences of a predefined language based on a predefined language usage parameters associated with at least two or more languages of the speech input. Thus, based on a combination of the extraction of attributes, the AI engine based determination, the AI engine can generate a textual output in the predefined language retrieved from a first dataset that may include the predefined words corresponding to the speech input. Thus, the system and method of the present disclosure can enable to convert a multi-lingual speech input to text, thereby facilitating speech based control that can aid in various healthcare and education sector.

Referring to FIG. 1 that illustrates an exemplary network architecture (100) in which or with which system (102) of the present disclosure can be implemented, in accordance with an embodiment of the present disclosure. As illustrated, the exemplary architecture (100) includes a system (102) equipped with an artificial intelligence (AI) engine (214) for conversion of a speech based input to text. The speech based input can be received from a plurality of users (110-1, 110-2, . . . 110-n) (hereinafter interchangeably referred as user or client; and collectively referred to as users 110). Each user may be associated with at least one computing device (104-1, 104-2, . . . 104-n) (hereinafter interchangeably referred as a smart computing device or audio device; and collectively referred to as 104). The users (110) may interact with the system (102) by using their respective computing device (104), wherein the computing device (104) and the system (102) may communicate with each other over a network (106). The system (102) may be associated with a centralized server (112). Examples of the computing devices 104 can include, but are not limited to, a computing device 104 associated with healthcare and hospital based assets, education sector, customer based firms, a smart phone, a portable computer, a personal digital assistant, a handheld phone and the like.

Further, the network 106 can be a wireless network, a wired network, a cloud or a combination thereof that can be implemented as one of the different types of networks, such as Intranet, BLUETOOTH, MQTT Broker cloud, Local Area Network (LAN), Wide Area Network (WAN), Internet, and the like. Further, the network 106 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like. In an exemplary embodiment, the network 104 can be anHC-05 Bluetooth module which is an easy to use Bluetooth SPP (Serial Port Protocol) module, designed for transparent wireless serial connection setup.

According to various embodiments of the present disclosure, the system 100 can provide for an Artificial Intelligence (AI) based automatic speech detection and speech input generation by using signal processing analytics, particularly for providing input services in at least two or more languages and dialects. In an illustrative embodiment, the speech processing AI techniques can include, but not limited to, a Language Processing Algorithm and can be any or a combination of machine learning (referred to as ML hereinafter), deep learning (referred to as DL hereinafter), and natural language processing using concepts of neural network techniques. The technique and other data or speech model involved in the use of the technique can be accessed from a database in the server.

In an aspect, the system 102 can receive a speech input from the computing device 104. In an embodiment, the system 102 can receive a batch (collection) of speech queries pertaining to healthcare applications and can consider one speech input from the batch of speech inputs at a time for providing response. In an embodiment, the system 102 can be configured to receive an audio file pertaining to speech input, from a user 110 through an audio device 104. Then the first step is to obtain a first set of characters (also referred to as an emission matrix herein) followed by determining a first dataset and a predefined words pertaining to two or more languages to obtain the text.

In an embodiment, the audio file can be processed by the system 102 to obtain frequency spectral coefficients associated with each time frame among the plurality of time frames spaced along the duration of the audio file. The system 102 can determine the first set of characters associated with frequency spectral coefficients of each timeframe among the plurality of time frames. Based on the first set of characters at each timeframe, the system 102 can predict a first set of words to generate a first output sentence corresponding to the speech input of the audio file.

In another embodiment, the system 102 can determine a first data set that can include a corpus of sentences of a predefined language based on a predefined language usage parameters. In another embodiment, the language usage parameters can pertain to a corpus of sentences to define probabilities of different words occurring together to form a distribution of words to generate a sentence. In yet another embodiment, the distribution can be smoothed in order to improve performance for words in the first data set having lower frequency of occurrence.

In yet another embodiment, the first dataset can maintain plurality of predefined words and can append characters associated with the language identifiers to the predefined words to form a sentence till the speech input can be complete.

In another embodiment, the first dataset can include a plurality of speech inputs associated with a plurality of accents and dialects.

In an embodiment, the acoustic engine can be configured to filter out background noise, gender voice variations and tones endemic to a region.

In yet another embodiment, the first data set can also include slang words and variations of words based on usage endemic to a region.

In this way, the system 102 can compare and map the speech input with related text. Speech processing techniques can be performed by applying neural network, lexicon, syntactic and semantic analysis and forwarding the analysis to structured speech input language (referred to as SQL, hereinafter) for providing required response to the speech input. In an aspect, a server 112 can be operatively coupled with the system 102 that can store various speech models from which required response text can be selected.

In an embodiment, the system (102) for automatic conversion of speech input to text may include one or more processors coupled with a memory, wherein the memory may store instructions which when executed by the one or more processors may cause the system to perform the extraction, determination and generation of text steps as described hereinabove.

Figure 2:
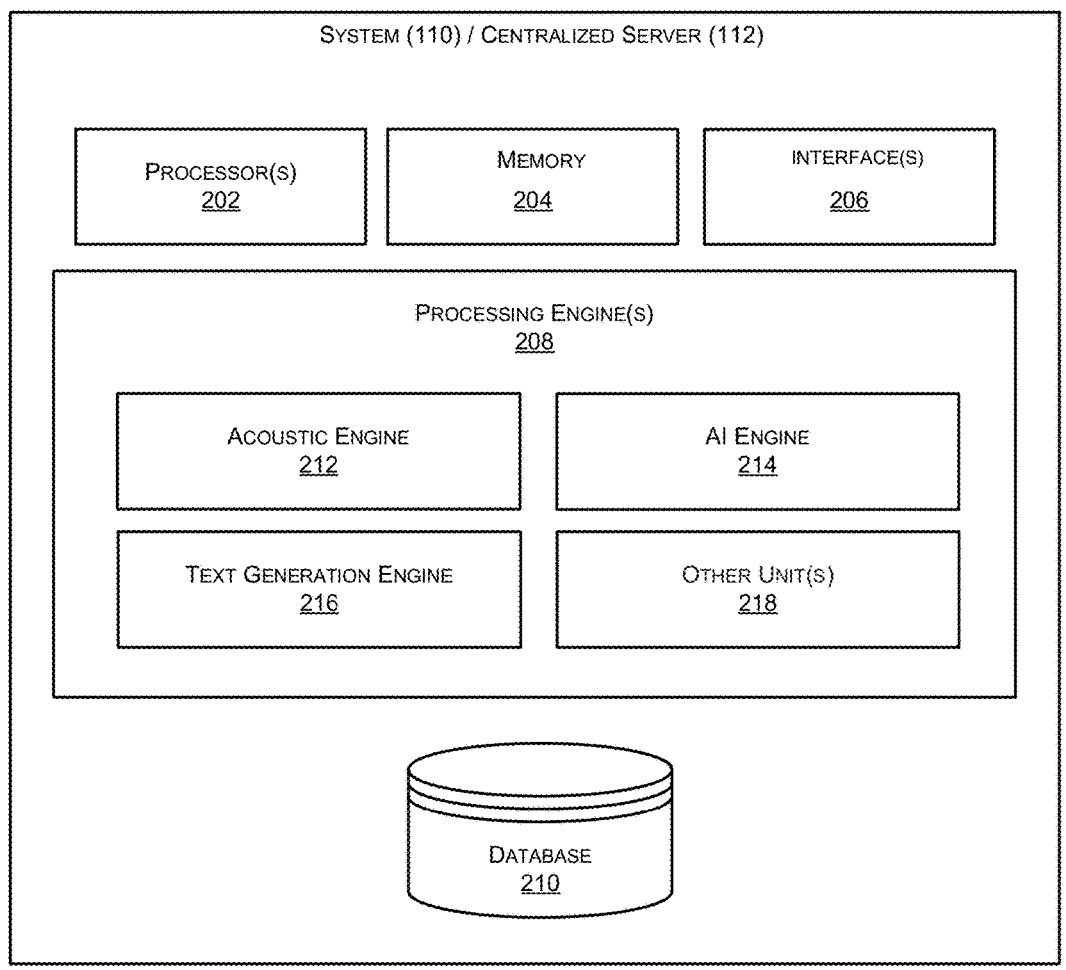
FIG. 2 illustrates an exemplary representation (200) of system (102) or a centralized server (112), in accordance with an embodiment of the present disclosure.

FIG. 2 illustrates an exemplary representation (200) of system (102) or a centralized server (112), in accordance with an embodiment of the present disclosure.

In an aspect, the system (102)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (102). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (102)/centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the system (102). The interface(s) 206 may also provide a communication pathway for one or more components of the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (102)/centralized server (112) may comprise the machine-readable storage medium storing the instructions and the processing resource to execute the instructions, or the machine-readable storage medium may be separate but accessible to the system (102)/centralized server (112) and the processing resource. In other examples, the processing engine(s) (208) may be implemented by electronic circuitry.

The processing engine (208) may include one or more engines selected from any of an acoustic engine (210), AI engine (214), text generation engine (216) and other units (218).

In an embodiment, the acoustic engine (212) can be responsible for extracting audio file from a user 110. In another embodiment, the audio file can include a plurality of speech inputs associated with a plurality of accents and dialects endemic to a region. The acoustic engine (212) upon receiving acknowledgement from one or more processor(s) 202 can extract a first set of attributes of the audio file that indicate time frames associated with the audio file. In an exemplary embodiment, Gated Convolutional Neural Network can be used to extract each time frame from a plurality of time frames associate with the audio file. The Gated Convolution Network can consist of at least 14 Convolution layers with Gated Linear Units which can be weight normalized and dropout can be applied. The final output of the Neural network can be a character or a space. In an exemplary embodiment, the user (110) can use an audio device (104) to provide a speech input which can be further processed to extract a second set of attributes pertaining to speech patterns associated with two or more languages of the speech.

In another embodiment, the acoustic engine can be configured to filter out background noise, gender voice variations and tones endemic to a region. In yet another embodiment, the audio file can be processed to obtain frequency spectral coefficients of each time frame to obtain an emission matrix that can include a first set of characters. Thus, the acoustic engine (212) can predict from the speech patterns, the first set of characters indicative of identifiers of any or a combination of at least two or more languages and at least two or more dialects of the speech by performing complex speech processing operations upon obtaining the first and second set of attributes and generate an output sentence from the predicted first set of characters. Therefore, the advantage can be that the acoustic engine (212) can ensure that the system 102 efficiently handle and manage data in a manner such that only relevant data or processed data can be transmitted to devices that are operatively coupled with it.

The Artificial Intelligence (AI) engine 214 can include components of artificial intelligence that can enable the system (102) to determine a first data set associated with any or a combination of at least two or more languages to provide a language model to the system (102). The first data set can include a corpus of sentences of a predefined language based on a predefined language usage parameters. The AI Engine (214) can define probabilities of different words occurring together to form a distribution of words to generate a sentence. The AI Engine (214) can also smoothen the distribution in order to improve performance for words in the first data set having lower frequency of occurrence. In yet another embodiment, the AI Engine (214) can be configured to maintain the plurality of predefined words in the first dataset and append characters associated to the predefined words to form a sentence till the speech input is complete.

In another embodiment, the first data set can also include slang words and variations of words based on usage endemic to a region.

The AI engine (214) further can further include a decoder engine to generate a textual output in the predefined language. The textual output can be predicted by the decoder engine associated with the AI Engine (214) from the first dataset comprising predefined words corresponding to the speech input based on a combination of the extraction of first and second set of attributes, prediction of the first output sentence from the acoustic engine (212) and said AI engine based determination of the language model.

Hence, the AI engine (214) can understand the speech input generated in at least two or more natural language. In an exemplary implementation, artificial intelligence can be implemented using techniques such as Machine Learning (referred to as ML hereinafter) that can focus on the development of programs and can access data and use the data to learn from it. The ML can provide the ability for the system (102) to learn automatically and train the system (102) from experience without the necessity of being explicitly programmed. In another exemplary implementation, artificial intelligence can be implemented using deep learning (referred to as DL hereinafter) which is a subset of ML and can be used for big data processing for knowledge application, knowledge discovery, and knowledge-based prediction. The DL can be a network capable of learning from unstructured or unsupervised data. In yet another exemplary implementation, artificial intelligence can use techniques such as Natural Language Processing (referred to as NLP hereinafter) which can enable the system (102) to understand human speech. The NLP can make extensive use of phases of compiler such as syntax analysis and lexical analysis. For example, NLP=Text Processing+Machine Learning. The NLP can make use of any or a combination of a set of symbols and a set of rules that govern a particular language. Symbols can be combined and used for broadcasting the response and rules can dominate the symbols in the language. The AI engine (214) can herein teach machines through its ability to perform complex tasks in language not limited to dialogue generation, machine translation, summarization of text, sentiment analysis. The present disclosure provides for a speech enabled input system to help in reducing human effort. This can be an added advantage.

In yet another embodiment, the Text generation engine (216) can combine the results of the AI engine (214) that return a textual output. The Text generation engine (216) can finally generate a complete sentence in response to the speech input by combining the predefined words and characters appended from the first dataset. In an exemplary implementation, language of the sentence can be in any predefined typescript, by using a first dataset that can include words of a plurality of languages generated in the predefined typescript. For example, the predefined transcript can be in English or any other language and the first dataset can include words of any or a combination of Hindi and English languages or any other combination of languages.

In an exemplary implementation, the system can be trained to convert a speech input uttered in a combination of a plurality of languages to obtain text in the predefined language.

Figure 3:
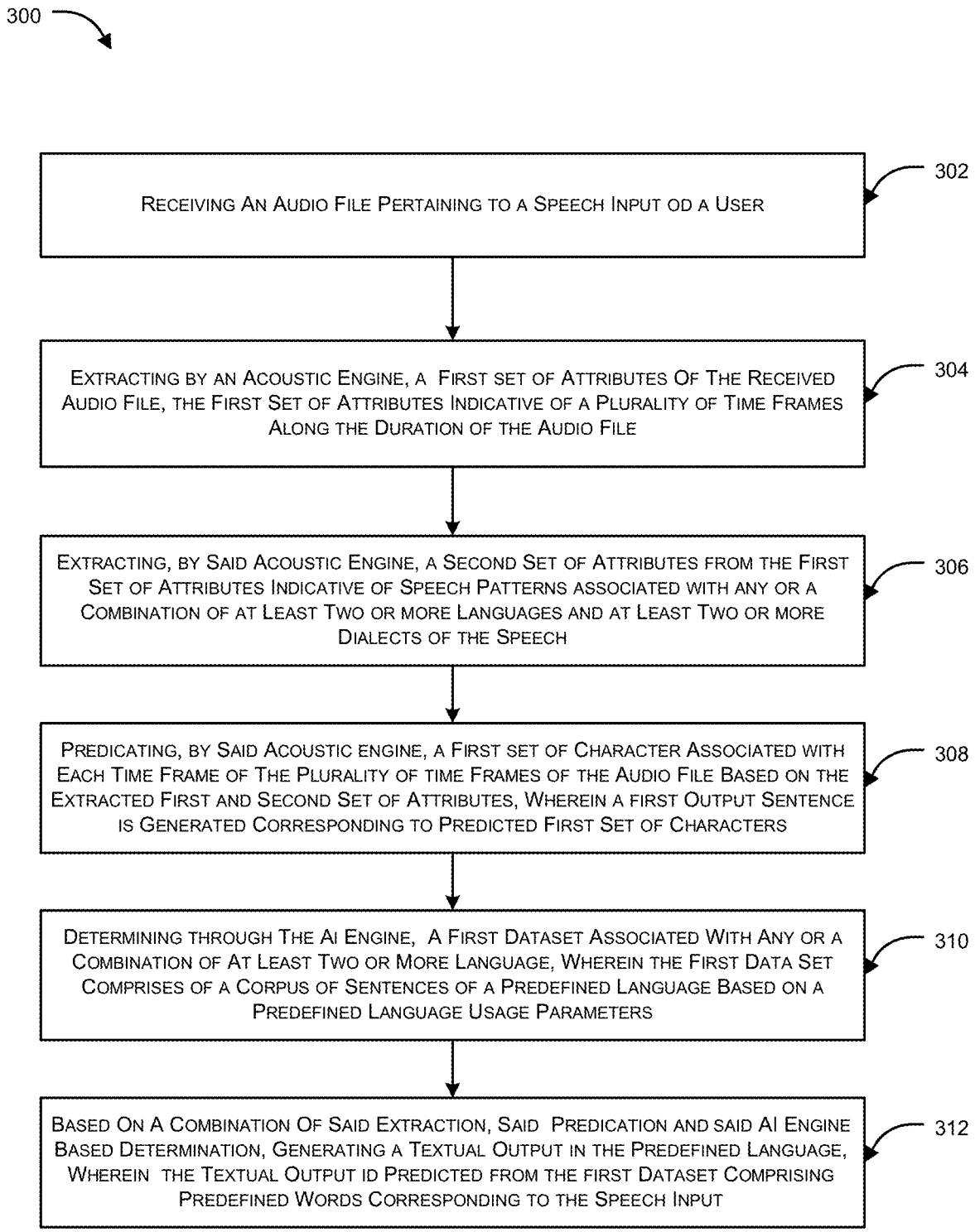
FIG. 3 illustrates an exemplary method flow diagram (300) depicting a method for in accordance with an embodiment of the present disclosure.

FIG. 3 illustrates an exemplary method flow diagram (300) depicting a method for in accordance with an embodiment of the present disclosure.

At step 302, the method includes the step of receiving a set of data packets of an audio file pertaining to speech of a user.

Further, at step 304, the method includes the step of extracting, by an acoustic engine of the system, a first set of attributes from the received audio file, the first set of attributes can indicate plurality of time frames spaced along the duration of the audio file.

At step 306, the method includes the step of extracting, by the acoustic engine, a second set of attributes from the first set of attributes, the second set of attributes can be indicative of speech patterns associated with any or a combination of at least two or more languages and at least two or more dialects of the speech.

Furthermore, at step 308, the method includes the step of predicting, by the acoustic engine, a first set of characters associated with each time frame of the plurality of time frames of the audio file based on the extracted first and second set of attributes and generating a first output sentence corresponding to the predicted first set of characters; and at step 310, the method includes the step of determining, a first data set associated with any or a combination of at least two or more languages, the first data set can include a corpus of sentences of a predefined language corresponding to a predefined language usage parameters; and based on a combination of the acoustic engine based extraction, acoustic engine based prediction and said AI engine based determination, a step 312 of generating a textual output in the predefined language. The textual output can be predicted from the first dataset that can include predefined words corresponding to the speech input.

The system and method of the present disclosure may be further described in view of exemplary embodiments.

Figure 4:
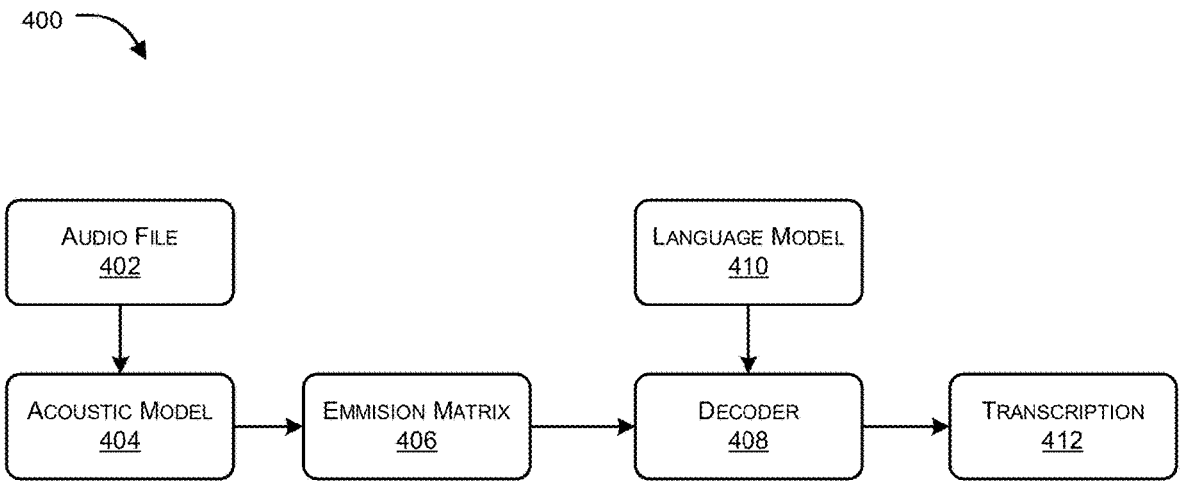
FIG. 4 illustrates an exemplary block flow representation (400) of the proposed system, in accordance with an embodiment of the present disclosure.

FIG. 4 illustrates an exemplary block diagram representation (400) of the proposed system, in accordance with an embodiment of the present disclosure.

As illustrated in FIG. 4, the block diagram includes an audio file at block 402.

The audio file is then provided to acoustic model at block 404 which is again sent to emission matrix at block 406. The output of emission block at 404 is sent to decoder at block 408. The decoder at block 408 also receives input from Language model at block 410. The output of the decoder 408 is sent to Transcription 412 and the output of transcription at block 412 is the text obtained in response to the audio file received at block 402.

The exemplary block diagram in abovementioned representation may be further described in view of exemplary embodiments.

Figure 5:
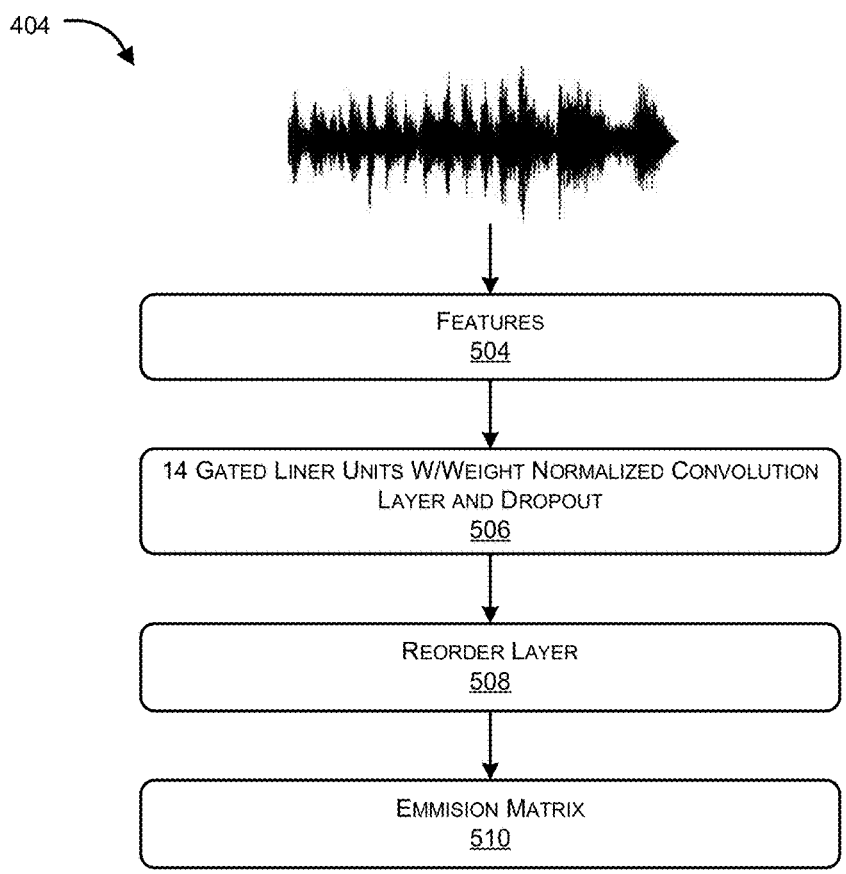
FIG. 5 illustrates an exemplary representation (500) of sub modules of an acoustic model (404) in accordance with an embodiment of the present disclosure.

FIG. 5 illustrates an exemplary representation (500) of sub modules of an acoustic model (404) in accordance with an embodiment of the present disclosure.

As illustrated in FIG. 5, the acoustic model (404) can include the following sub modules such as audio file with frequency spectral coefficients at block 502 which is then sent to features extraction at block 504. The features obtained at block 504 are sent to at least 14 Gated Linear Units at block 506, the output of which is sent to reorder layer at block 508 and then from block 508, the output is sent to emission matrix at block 510.

In an embodiment, the audio file can be processed to obtain mel frequency spectral coefficients and then each time frame can be passed through a Gated Convolutional Neural Network that has been fitted with a highly customized dataset. The convolution Network can consist of at least 14 Convolution layers with Gated Linear Units which can be weight normalized and dropout can be applied. The final output of the Neural network can be a character in the predefined language or a space. Each output is appended together to obtain the emission matrix. In an exemplary implementation, the predefined language can be an English language.

In an embodiment, the Gate Linear Units (also referred to as GLU herein) can be a type of activation function made for Convolution Neural network (also referred to as CNN herein) to make use of the fact that a CNN layer has plurality dimensions. Here the type of can be the sigmoid function along with dot product which is given by $$GLU(x) = x[i] \circ c(x[j]),$$

where 0 denotes the element-wise product x[i] is the first half of the input, x[j] is the second half, and σ(x) is the sigmoid function.

In another embodiment, the Features can include use of Mel Frequency Spectral Coefficients (MFSC) rather than Mel Frequency Cepstral Coefficients (MFCC) as some information might be lost while performing DCT (Discrete Cosine transformation) to obtain part of the data from CNN.

Figures 6A, 6B:
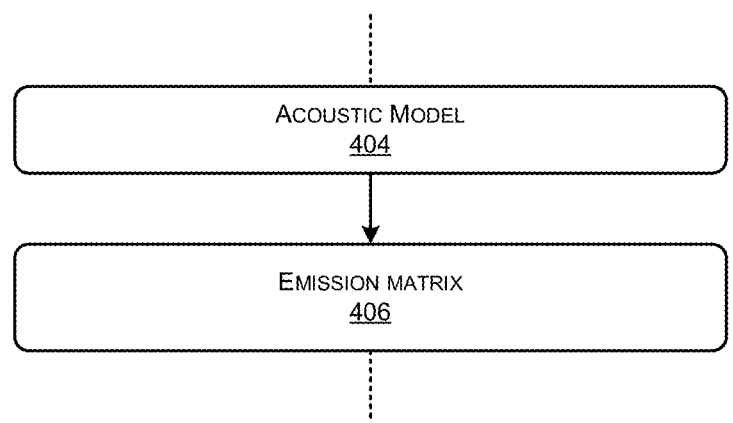
FIGS. 6A and 6B illustrate exemplary representations (600) and elaborate upon a sub module 404 of the block flow representation (400), in accordance with an embodiment of the present disclosure.

FIGS. 6A and 6B illustrate exemplary representations (600) and elaborate upon a sub module 404 of the block flow representation (400), in accordance with an embodiment of the present disclosure.

FIG. 6A elaborates upon an emission matrix (406) through an exemplary matrix illustration. FIG. 6B illustrates the output of acoustic model at block 404 coming out to emission matrix at block 406.

In an exemplary embodiment, the emission matrix (406) can include the language and dialect identifiers of each timeframe acquired from the prediction of the Acoustic model (404). These probabilities can be used to find which language identifiers occur at which timeframe at which probability and can be used to find the words in the audio file (402) by using the associated identifiers. This can be used as the input for the Decoder (408) along with the Pre-processed language model (410).

Figure 7:
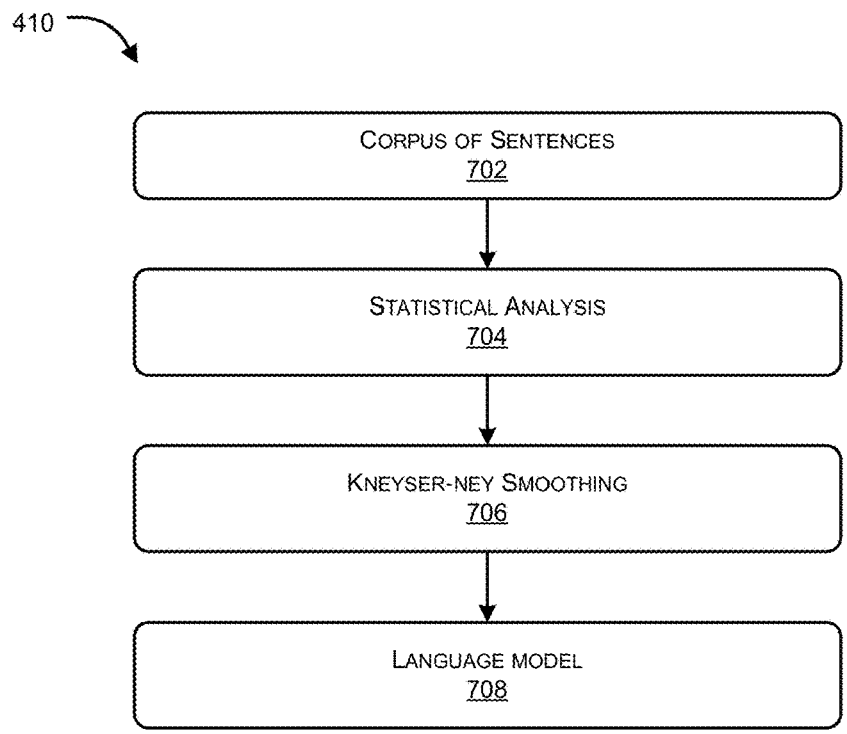
FIG. 7 illustrates an exemplary representation (700) of sub modules of a language model (410) in accordance with an embodiment of the present disclosure.

FIG. 7 illustrates an exemplary representation (700) of sub modules of a language model (410) in accordance with an embodiment of the present disclosure.

As illustrated in FIG. 7, the Language model (410) can include at block 702 Corpus of sentences, the output of which is sent for statistical analysis at block 704 which is further sent for Kneyser-Ney smoothening at block 706 to obtain a language model at block 708 (410).

In an exemplary embodiment, a Corpus of Sentences (702) can be trained using the Scalable Modified Kneser-Ney Language Model Estimation method (706) which can be a probability distribution method to find the associated n-tuples for forming sentences. The Language model (410) can be made of a distribution of a second set of words based on the number of time they occur in a given corpus. Then the distribution can be smoothed in order to improve performance for the second set of words that occur less often. This can be used in the beam decoder (408) along with the emission matrix (406) received from the acoustic model (404).

Figure 8A:
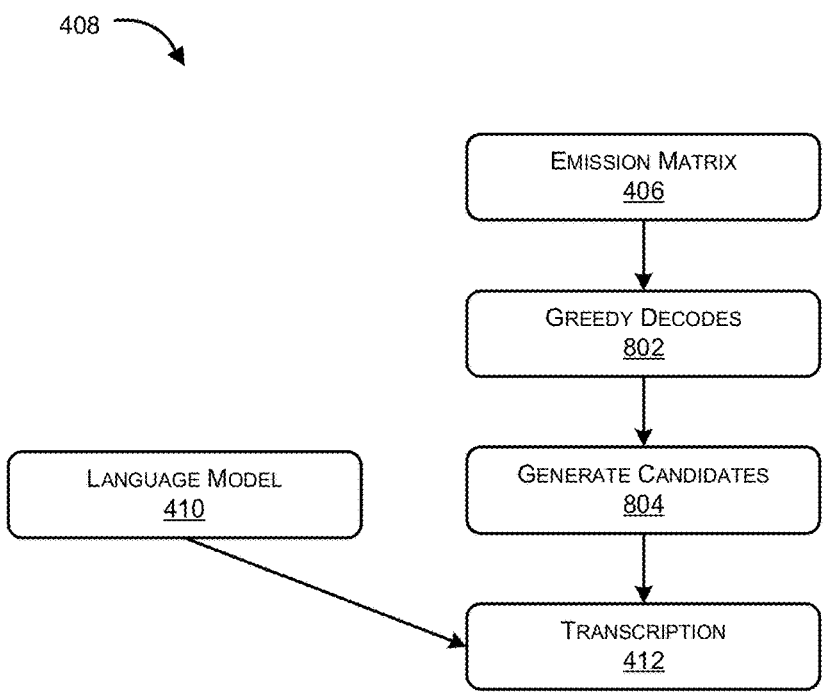
FIGS. 8A-8C illustrate exemplary representations (800) depicting sub modules of a decoder model (408), in accordance with an embodiment of the present disclosure.
Figure 8B:
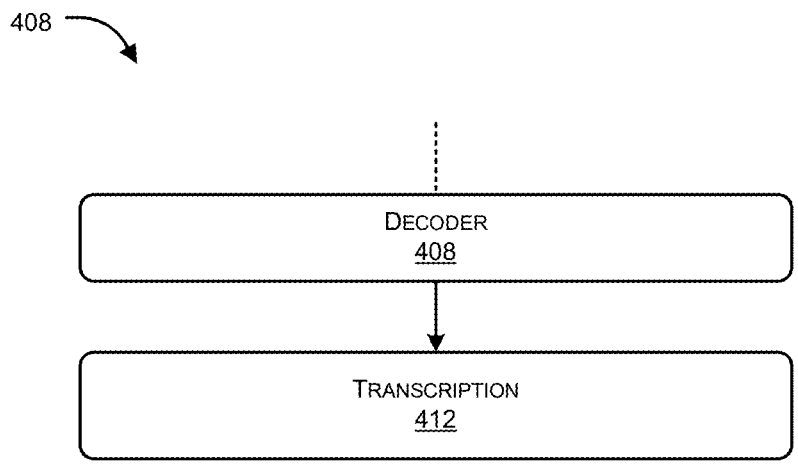
Figure 8C:
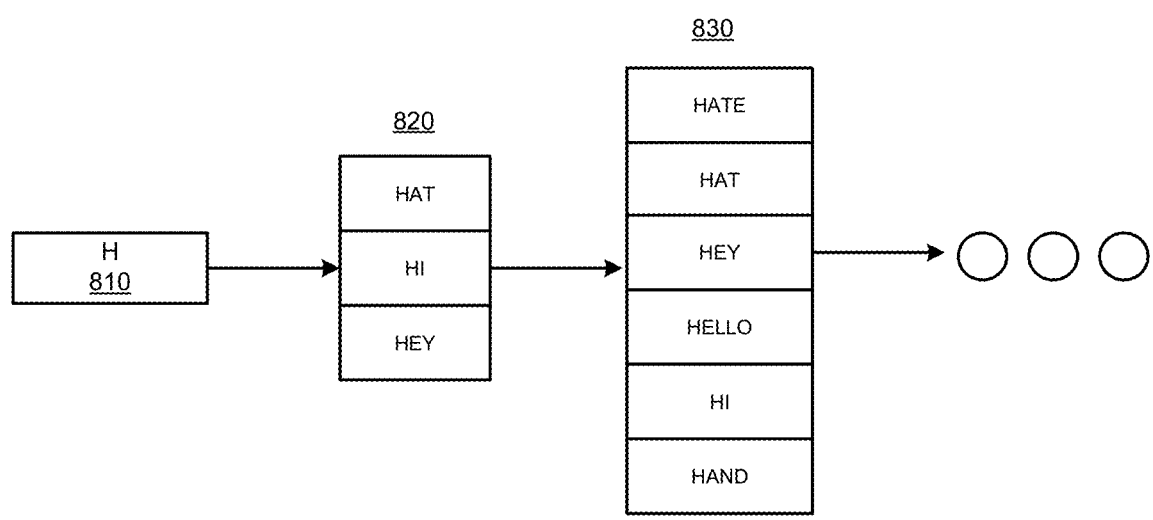

FIGS. 8A-8C illustrate exemplary representations (800) depicting sub modules of a decoder model (408), in accordance with an embodiment of the present disclosure.

As illustrated in FIG. 8A, the decoder (408) can include at block 802 greedy decodes that decodes output obtained from the emission matrix at block 406. The output of which is sent to generate predefined at block 804 which is further sent for Transcription at block 806 which also receives input from the language model at block 410.

In an exemplary embodiment, the emission matrix (406) can be passed through a beam decoder (408) to obtain the transcription (412). The decoder (408) can use the Language Model (410) as a constraint to the possible words formed and can use the probabilities of the language identifiers used to give the transcription (412). The decoder (408) can maintain plurality of predefined words and can append language identifiers to determine a sentence. The predefined words as the third dataset can be scored using the probability distribution acquired from the predefined language model (410) and the probability of the predefined words occurring according to the emission matrix (408) using identifier-wise probabilities. The above steps can be done for all the time-frames of the emission matrix (406) till the audio clip can be complete. Once all the rows of the emission matrix (406) are over a sentences of the predefined words can be returned as the transcription (412).

FIG. 8B illustrates that the output of decoder at block 408 is sent to Transcription at block 412.

FIG. 8C illustrates how the decoder (408) can return the second set of words and select predefined words from the third dataset which can be the result of Transcription (412).

Figure 9:
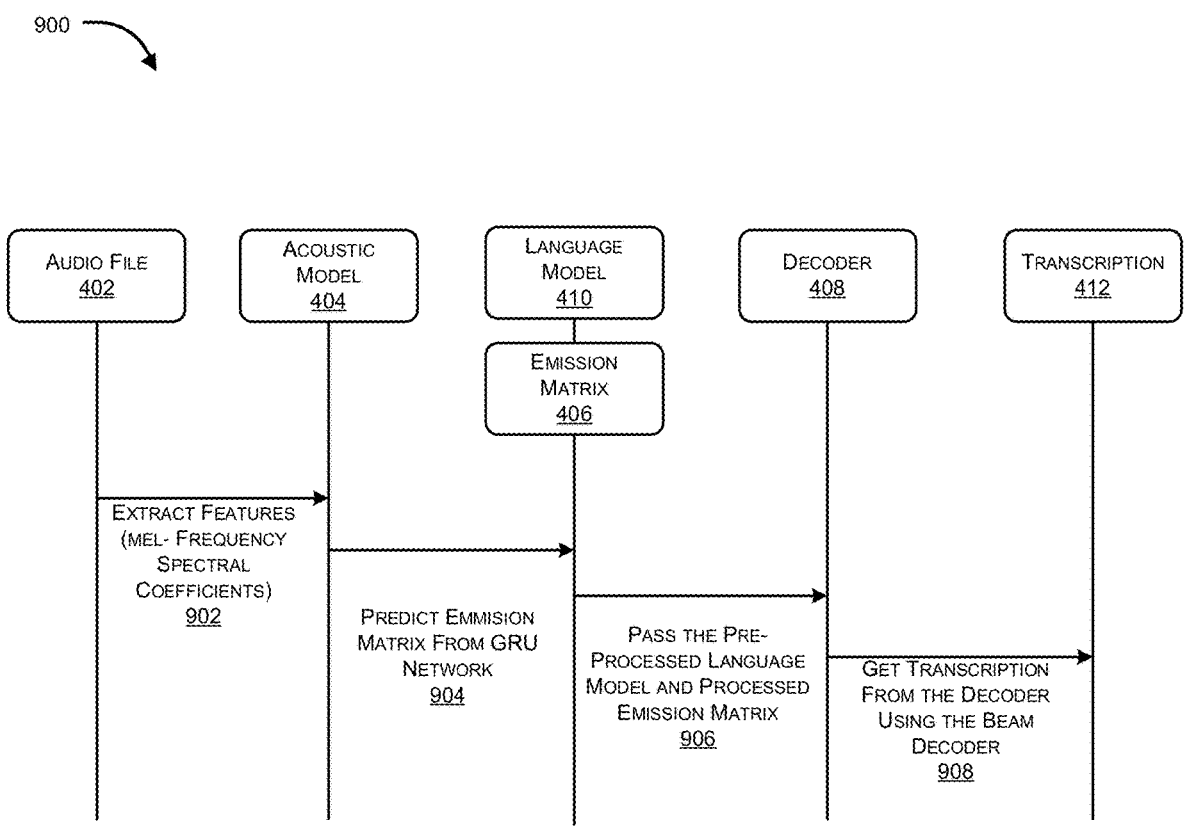
FIG. 9 illustrate an exemplary implementation (900) of the exemplary overview of the proposed system (102), in accordance with an embodiment of the present disclosure.

FIG. 9 illustrate an exemplary implementation (900) of the exemplary overview of the proposed system (102), in accordance with an embodiment of the present disclosure.

As illustrated, the proposed system can be thus summarised through a system block flow diagram that can include at block 902 extract features (Mel-frequency spectral coefficients) from audio file at block 402 to send it to acoustic model at block 404. At block 904, predict emission matrix from GLU network and obtain constraints from the language model at block 410 to generate the emission matrix at block 406. The pre-processed Language model and the processed emission matrix at block 906 is passed to decoder at block 408 after which at block 908 get transcription from the decoder using the beam decoder to obtain Transcription at block 412.

Figure 10A:
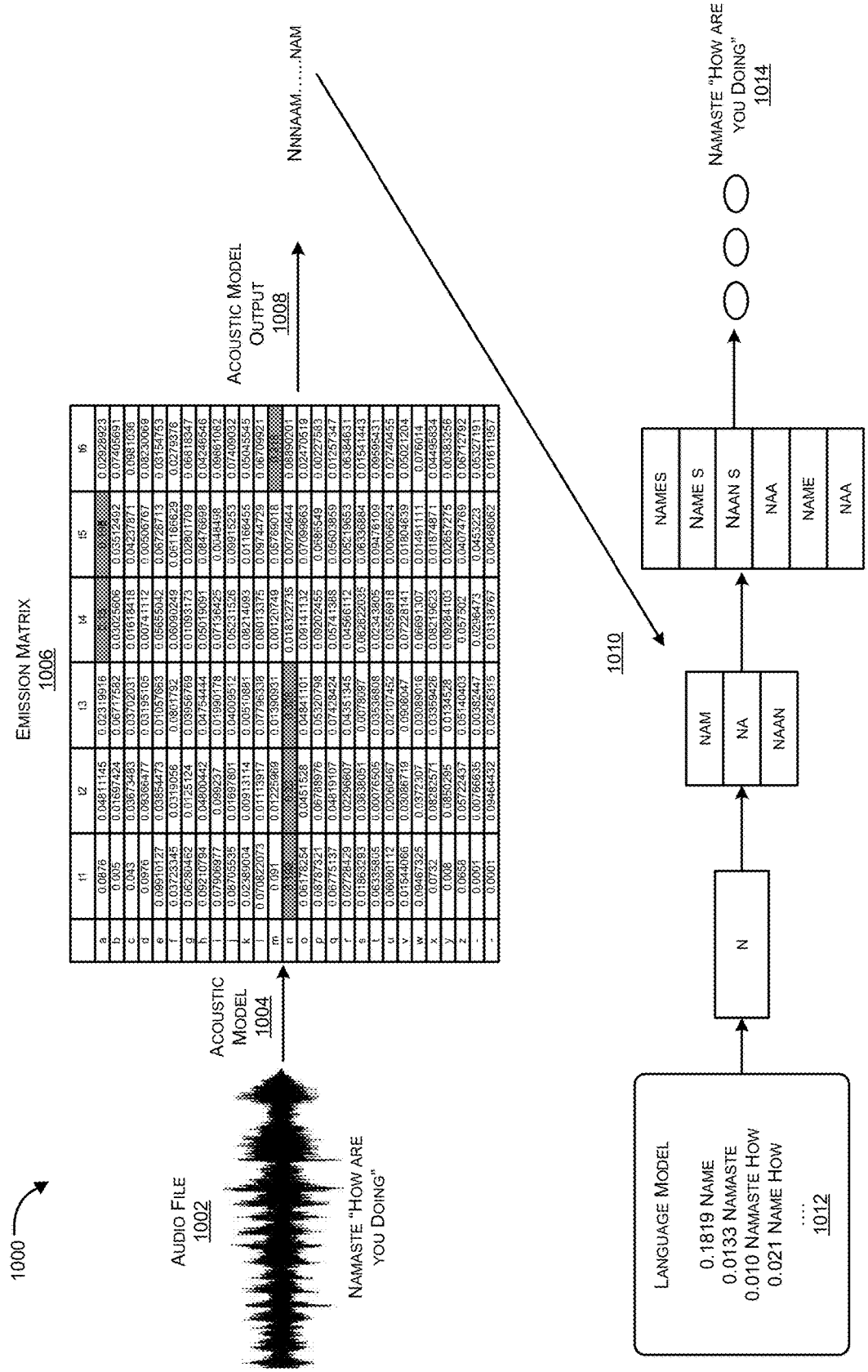
FIGS. 10A-10B illustrate exemplary implementations (1000) of the exemplary overview showing the workability of system (102) and method (300), in accordance with an embodiment of the present disclosure.
Figure 10B:
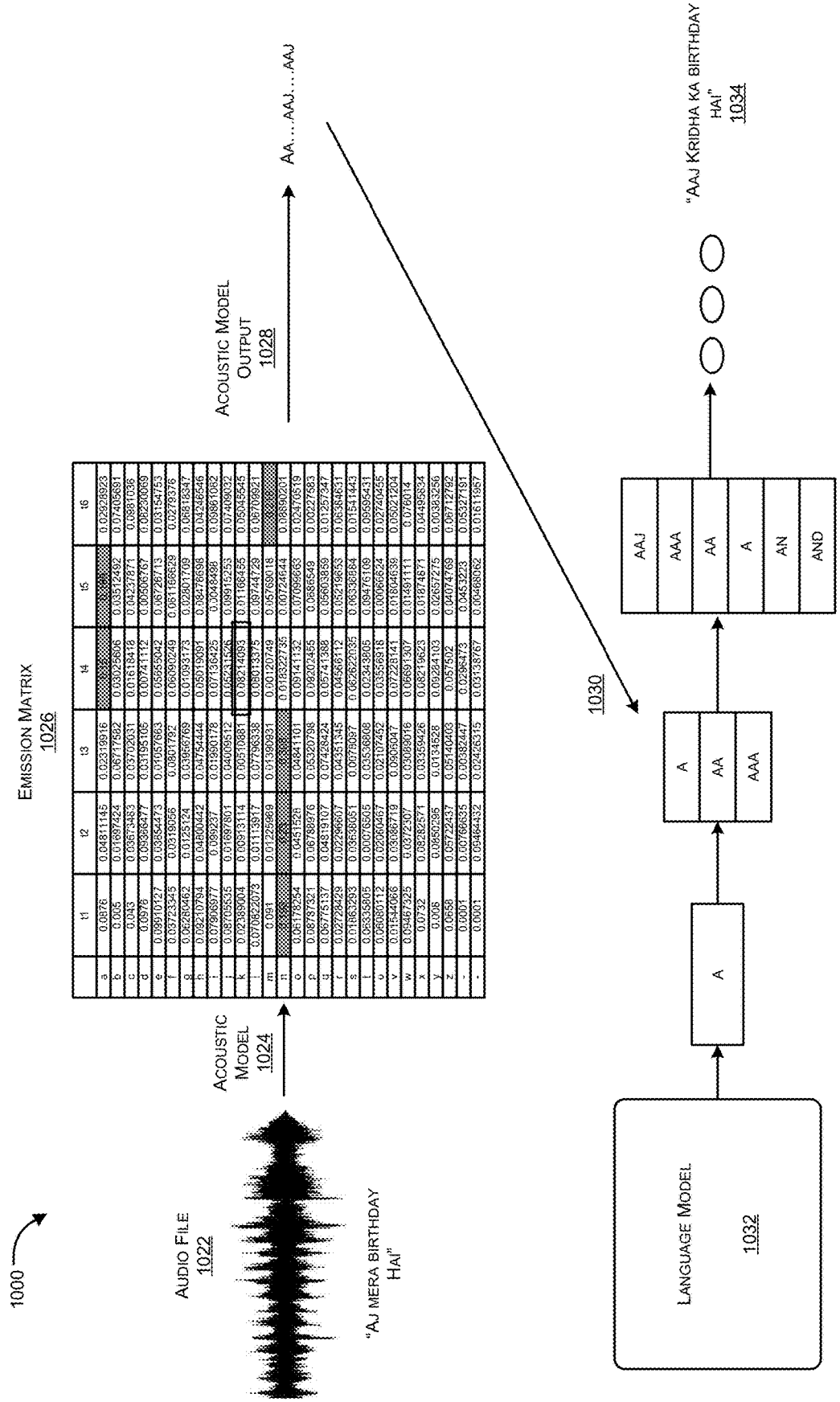

FIGS. 10A-10B illustrate exemplary implementations (1000) of the exemplary overview showing the workability of system (102) and method (300), in accordance with an embodiment of the present disclosure.

As illustrated in FIG. 10A, in an exemplary implementation, the end to end transcription process can be broken down as:

The system can receive an audio file (1002) containing the speech in the Hinglish language ('Namaste how are you doing') in the present case.

The changed output (1008) from acoustic model (1004) along with the language model (1012) then can construct a sentence from the audio signal. In the implementation it can be 'Namaskar How are you'.

The features from the input audio file 1002 can be passed on to the Acoustic model (1004). The Acoustic model (1004) then can generate the 'Emission Matrix' (1006) as the output. The emission matrix (1006) can contain the probability distribution of the characters associated with the language identifiers per timeframe window. In the exemplary implementation, from the emission matrix, it can be seen that for the first at least 6 time frame windows the characters 'nnnaam . . . ' (1008) come out as the highest probability characters.

A greedy decoder (1010) then can compress the repeated characters to one character until there can exist a separator token ('-'). In exemplary implementation the output 'nnnaam . . . ' Can compress the output to 'nam . . . '

The changed output from acoustic model along with the language model then can construct a sentence from the audio signal which can be 'Namaskar How are you' (1014).

As illustrated in FIG. 10b, in another exemplary implementation, the end to end transcription process can be broken down as:

The system can receive an audio file (1022) containing the speech in the Hinglish language ('aaj Kridha ka birthday hai") in the present case.

The changed output (1028) from acoustic model (1024) along with the pre-constructed language model (1032) then can construct a sentence from the audio signal. In the implementation it can be 'aaj Kridha ka janamdin hai".

The features from the input audio file can be passed on to the Acoustic model. The Acoustic model then can generate the 'Emission Matrix' as the output. The emission matrix can contain the probability distribution of the characters associated with the language identifiers per timeframe window. In the exemplary implementation, from the emission matrix, it can be seen that for the first at least 6 time frame windows the characters 'aaaaaj . . . ' come out as the highest probability characters.

A greedy decoder (1030) then can compress the repeated characters to one character until there can exist a separator token ('-'). In exemplary implementation the output 'aaaajjjj . . . ' Can compress the output to 'aaj . . . '

The changed output (1028) from acoustic model (1024) along with the language model (1032) then can construct a sentence from the audio signal which can be 'Aaj Kridha ka birthday hai' (1034).

Thus, the present disclosure provides a unique and inventive solution for efficiently converting speech consisting of two or more languages and dialects to a corresponding text in a predefined language, thus providing an automated solution to reduce/remove the human dependency for providing accurate and error free analysis. The solution offered by the present disclosure ensures that the evaluation is consistent as well as accurate/precise due to the involvement of well-trained AI engine.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and a method that facilitates converting a speech input having words from one or more languages in conjunction.

The present disclosure provides for a system and a method that facilitates efficient handling of Hinglish words.

The present disclosure provides for a system and a method to facilitate customization to address any mix of languages.

The present disclosure provides for a system and a method that facilitates inclusion of a wide variety of speakers with different accents and dialects from across India.

The present disclosure provides for a system and a method that facilitates inclusion of background noise, gender voice variations, tones, word usage and variations that are endemic to a specific region.

The present disclosure provides for a system and a method that utilises slang words.

The present disclosure provides for a system and a method that aids customer facing firms where they aim to resolve customer queries and provide them with appropriate resolutions.

The present disclosure provides for a system and a method that enables learning process in the education domain.

The present disclosure provides for a system and a method that enables speech to text conversion in Chat bots.

The present disclosure provides for a system and a method that facilitates aid in automating transcriptions.

The present disclosure provides for a system and a method that facilitates speech based controls.

The present disclosure provides for a system and a method that facilitates aid in healthcare operations.

The present disclosure provides for a system and a method that facilitates aid in accessibility for the differently-abled.

The present disclosure provides for a system and a method that facilitates automatic emotion detection.

We claim:

1. A system enabling automatic conversion of a speech input to a textual output, said system comprising a processor that executes a set of executable instructions that are stored in a memory, upon which execution, the processor causes the system to:
  receive a set of data packets comprising an audio file pertaining to speech of a user;
  extract, by an acoustic engine of the system, a first set of attributes from the received audio file, wherein the first set of attributes are indicative of a plurality of time frames spaced along the duration of the audio file;
  extract, by said acoustic engine, a second set of attributes from the first set of attributes indicative of speech patterns associated with any or a combination of at least two or more languages and at least two or more dialects of the speech;
  apply a neural network with gated linear units, by said acoustic engine, to process the extracted first and second set of attributes and predict a first set of characters associated with each time frame of the plurality of time frames of the audio file based on the extracted first and second set of attributes, wherein a first output sentence is generated corresponding to the predicted first set of characters;
  determine, through an artificial intelligence (AI) engine, a first data set associated with any or a combination of said at least two or more languages to provide a language model, wherein the first data set comprises of a corpus of sentences of a predefined language based on predefined language usage parameters, and wherein the first data set maintains a plurality of predefined words and appends characters associated with the plurality of predefined words to form a sentence in real time till the speech input is complete; and
  generate, by a decoder engine, a textual output in the predefined language based on a combination of said extracted first and second set of attributes, said predicted first set of characters, and said AI engine based determination, wherein the textual output is predicted from the first data set comprising predefined words corresponding to the speech input,
  wherein the AI engine is implemented using a machine learning algorithm that automatically trains the system.

2. The system as claimed in claim 1, wherein the audio file comprises frequency spectral coefficients associated with each time frame among the plurality of time frames spaced along the duration of the audio file.

3. The system as claimed in claim 1, wherein the predefined language usage parameters pertain to a corpus of sentences to define probabilities of different words occurring together to form a distribution of words to generate a sentence.

4. The system as claimed in claim 3, wherein the distribution is smoothed in order to improve performance for words in the first data set having lower frequency of occurrence.

5. The system as claimed in claim 1, wherein the audio file comprises a plurality of speech inputs associated with a plurality of accents and dialects.

6. The system as claimed in claim 1, wherein the acoustic engine is configured to filter out background noise, gender voice variations, and tones endemic to a region.

7. The system as claimed in claim 1, wherein the first data set comprises slang words and variations of words based on usage endemic to a region.

8. The system as claimed in claim 1, wherein the system is trained to convert the speech input uttered in a combination of a plurality of languages to obtain the textual output in the predefined language.

9. A method enabling automatic conversion of speech input to textual output, said method comprising:
  receiving a set of data packets comprising an audio file pertaining to speech of a user;
  extracting, by an acoustic engine of a system, a first set of attributes from the received audio file, wherein the first set of attributes are indicative of a plurality of time frames spaced along the duration of the audio file;

extracting, by said acoustic engine, a second set of attributes from the first set of attributes indicative of speech patterns associated with any or a combination of at least two or more languages and at least two or more dialects of the speech;

applying a neural network with gated linear units, by said acoustic engine, to process the extracted first and second set of attributes and predict a first set of characters associated with each time frame of the plurality of time frames of the audio file based on the extracted first and second set of attributes, wherein a first output sentence is generated corresponding to the predicted first set of characters;

determining, through an artificial intelligence (AI) engine, a first data set associated with any or a combination of said at least two or more languages to provide a language model, wherein the first data set comprises of a corpus of sentences of a predefined language based on predefined language usage parameters, and wherein the first data set maintains a plurality of predefined words and appends characters associated with the plurality of predefined words to form a sentence in real time till the speech input is complete; and generating, by a decoder engine, a textual output in the predefined language based on a combination of said extracted first and second set of attributes, said predicted first set of characters, and said AI engine based determination, wherein the textual output is predicted from the first data set comprising predefined words corresponding to the speech input, wherein the AI engine is implemented using a machine learning algorithm that automatically trains the system.

10. The method as claimed in claim 9, wherein the audio file comprises frequency spectral coefficients associated with each time frame among the plurality of time frames spaced along the duration of the audio file.

11. The method as claimed in claim 9, wherein the predefined language usage parameters pertain to a corpus of sentences to define probabilities of different words occurring together to form a distribution of words to generate a sentence.

12. The method as claimed in claim 11, wherein the distribution is smoothed in order to improve performance for words in the first data set having lower frequency of occurrence.

13. The method as claimed in claim 9, wherein the audio file comprises a plurality of speech inputs associated with a plurality of accents and dialects.

14. The method as claimed in claim 9, wherein the acoustic engine is configured to filter out background noise, gender voice variations, and tones endemic to a region.

15. The method as claimed in claim 9, wherein the first data set comprises slang words and variations of words based on usage endemic to a region.

16. The method as claimed in claim 9, wherein the method is trained to convert the speech input uttered in a combination of a plurality of languages to obtain the textual output in the predefined language.

* * * * *